United States Patent [19]

Lee

[11] Patent Number: 5,669,569
[45] Date of Patent: Sep. 23, 1997

[54] REEL BRAKING MECHANISM IN MAGNETIC RECORDING OR REPRODUCING APPARATUS

[75] Inventor: Min-su Lee, Uiwang, Rep. of Korea

[73] Assignee: Samsung Electronics Co., Ltd., Kyungki-do, Rep. of Korea

[21] Appl. No.: 650,753

[22] Filed: May 20, 1996

[30] Foreign Application Priority Data

May 18, 1995 [KR] Rep. of Korea ............ 95-12461

[51] Int. Cl.$^6$ ...................................... G11B 15/16
[52] U.S. Cl. ............................ 242/355.1; 242/336
[58] Field of Search ....................... 242/336, 352.1, 242/355, 355.1; 360/94

[56] References Cited

U.S. PATENT DOCUMENTS

| | | | |
|---|---|---|---|
| 3,921,933 | 11/1975 | Rotter et al. | |
| 4,490,757 | 12/1984 | Mogi | 360/94 |
| 4,873,593 | 10/1989 | Baranski | 360/94 |
| 5,082,195 | 1/1992 | Saito et al. | 242/336 |
| 5,316,236 | 5/1994 | Hasegawa et al. | 360/94 |
| 5,347,411 | 9/1994 | Choi | 242/341 |
| 5,583,718 | 12/1996 | Kobayashi | 360/94 |

*Primary Examiner*—John P. Darling
*Attorney, Agent, or Firm*—Sughrue, Mion, Zinn, Macpeak & Seas

[57] ABSTRACT

A reel braking mechanism for each reel table in a mechanism for controlling the distance between reel tables to accommodate different sizes of tape cassettes is provided. The reel braking mechanism has reel tables, rotating arms supporting brake members, a rotating apparatus for rotating the rotating arms, and moving members for moving the brake members. The brake members rotated by the movement of the moving members can be released from the reel tables.

17 Claims, 7 Drawing Sheets

REEL BRAKING MECHANISM IN MAGNETIC RECORDING OR REPRODUCING APPARATUS

BACKGROUND OF THE INVENTION

The present invention relates to a reel braking mechanism in a magnetic recording or reproducing apparatus such as a VTR, camcorder, or digital-video cassette recorder (D-VCR). More particularly, the invention relates to a reel braking mechanism for a magnetic recording or reproducing apparatus, which can accommodate cassettes having different sizes on movable reel tables having reel brakes and in which the operating position of the reel tables depends on the size of the cassette.

Generally, a pair of reel tables are provided in a magnetic recording or reproducing apparatus using a magnetic tape. A mechanism has recently been suggested in *Japan Television Associates* Vol. 44, No. 9, p. 1216 (FIG. 8), in which a pair of reel tables can move to accommodate tape cassettes of different sizes. FIG. 2 shows examples of two different sizes of tape cassettes. As shown in FIG. 1, reel tables 21 and 22 are mounted to slide along respective pairs of guide shafts 23, 23' and 24, 24', respectively. Timing belts 25 and 26 driven by a motor 27 enable the reel tables 21 and 22 to move, varying the distance therebetween to enable loading of tape cassettes of different sizes. This conventional arrangement, however, lacks a reel braking mechanism for controlling the rotational speed of the reel tables.

SUMMARY OF THE INVENTION

The object of the present invention is to provide a reel braking mechanism for use in a mechanism having movable reel tables to control the rotational speed of the reel tables when they assume different positions to receive tape cassettes of different sizes.

To achieve the above object, there is provided a reel braking mechanism in a magnetic recording or reproducing apparatus, comprising: a deck having first and second arcing holes; first and second pins, separated by a predetermined distance and fixed on the deck; a pair of rotating arms rotatably combined with the first and second pins, respectively, and supporting reel tables, for moving the reel tables to first and second positions; a pair of driving arms having gear portions engaged with each other rotatably combined with the first and second fixed pins, respectively; a driving motor for driving one of the gear portions of the driving arms, a driving force of the motor being transmitted by a gear train; means for connecting the driving arms to the rotating arms to transfer the force of the driving motor to the rotating arms; brake members rotatably combined with the first and second pins and rotatable together with the driving arms, for friction-contacting the reel tables to reduce the rotational speed of the reel tables; elastic biasing means for contacting the brake members firmly to peripheral surfaces of the reel tables; and releasing means for separating the brake members from peripheral surfaces of the reel tables.

It is preferred that the respective brake members comprise: boss portions connected to the first and second pins, respectively; arm portions extending from the boss portions toward the reel tables; friction portions attached at the ends of the arm portions; and springs connected to the arm portion for biasing the friction member to contact outer surfaces of the reel tables.

On the other hand, the releasing means comprises: gear portions formed in the brake members; moving members installed between the brake members to slide on the deck and to engage with the gear portions; and moving means for moving the moving members, wherein the brake members rotate with the movement of the moving members, thus releasing the brake members from the reel tables.

The moving means comprises: first and second solenoids each having operational rods, respectively, fixed to the deck; and operational levers each having connection portions rotatably supported by the deck and connected to the operational rods, and operational portions for interlocking with the moving members, wherein the moving members are moved a predetermined distance when the operational levers are rotated by the operation of at least one of the first and second solenoids.

The moving members have first and second protrusions spaced by a predetermined distance to make contact with the operational portions of the operational levers.

BRIEF DESCRIPTION OF THE DRAWINGS

The object and advantages of the present invention will become more apparent by a detailed description of a preferred embodiment thereof with reference to the attached drawings in which.

DETAILED DESCRIPTION OF THE INVENTION

Figure 1:
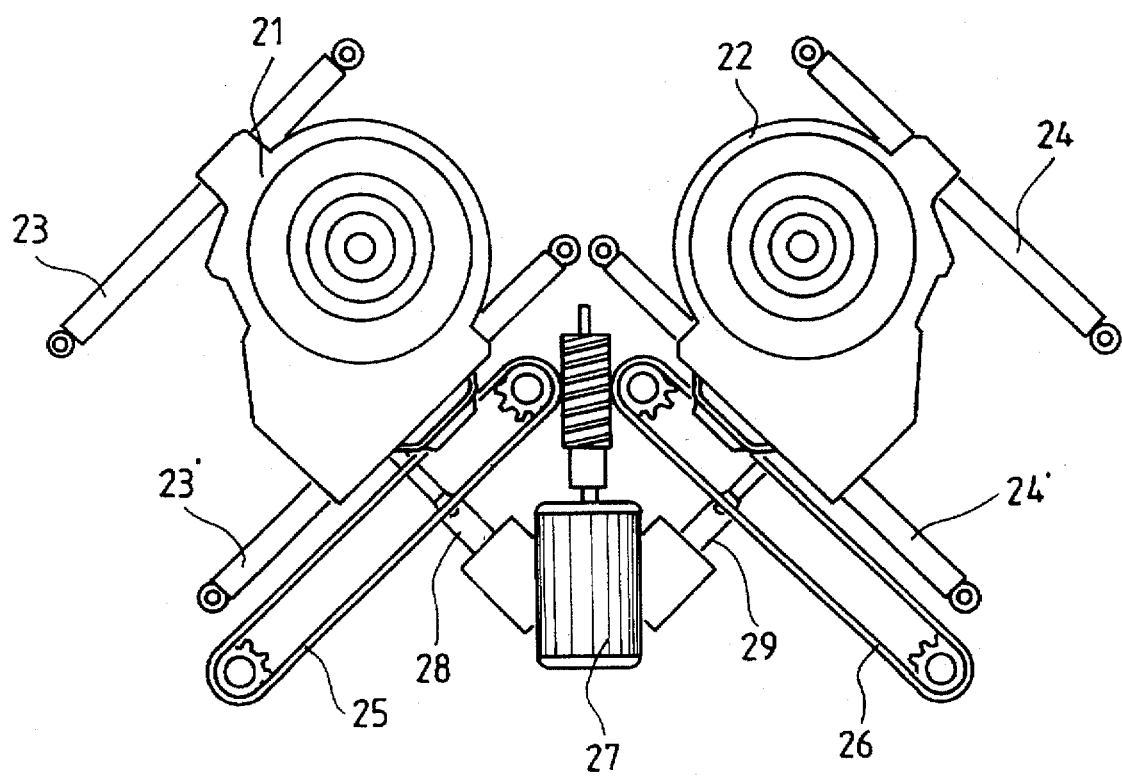
FIG. 1 is a plan view of a conventional mechanism for moving reel tables.

A preferred embodiment of the present invention will be described with reference to FIGS. 3 through 5. In a reel braking mechanism for a magnetic recording or reproducing apparatus according to the present invention, first and second arcing holes 200a and 200b are formed in a deck 200. First and second pins 218 and 228, separated by a predetermined distance, are installed between the holes 200a and 200b. Rotating arms 211 and 221 are rotatably connected to the first and second pins 218 and 228, respectively. Driving arms 212 and 222 each having geared portions 212a and 222a are also rotatably coupled to first and second pins 218 and 228. The geared portions 212a and 222a of the respective driving arms are engaged with each other. The driving arms 212 and 222 are elastically biased toward rotating arms 211 and 221, respectively, via springs 219a and 229a and washers 219b and 229b.

Brake members 260 and 270 are also rotatably connected to the first and second pins 218 and 228, respectively, to friction-contact reel tables 210 and 220 for reducing the rotational speed thereof. The brake members 260 and 270 each have gear portions 263 and 273, boss portions 262 and 272, arm portions 264 and 274, and friction portions 261 and 271 at the ends of arm portions 264 and 274. The brake members 260 and 270 are installed in conjunction with a biasing means to allow the friction members 261 and 271 to contact surfaces of the reel tables 210 and 220. The friction members 261 and 271 of the brake members 260 and 270 become separated from the reel tables 210 and 220 by a releasing means.

Meanwhile, a driving motor 230 for generating a driving force is installed on a portion of the deck 200, and transmits the driving force to the gear portion 222a via a gear train 232.

A connecting means for connecting the driving arms 212 and 222 and the rotating arms 211 and 221 is provided so that the power of the driving motor 230 can be transmitted to the respective rotating arms 211 and 221. The connecting means includes: cavities 212b and 222b formed on the respective lower surfaces of the driving arms 211 and 222; indented portions 211c and 221c formed on the respective rotating arms 211 and 221 and corresponding to the cavities 212b and 222b; and coil springs 213 and 223 disposed between the cavities 212b and 222b and indented portions 211c and 221c, respectively. That is, the coil springs 213 and 223 are disposed partly in cavities 212b and 222b, respectively and partly in indented portions 211c and 221c, respectively. Thus, the driving motor 230 transmits the power to the rotating arms 211 and 221 via the coil springs 213 and 223.

Here, reel tables 210 and 220 and motors 216 and 226 for rotating the tables are installed on the rotating arms 211 and 221, respectively. More specifically, coupling holes 211b and 221b, in which the motors 216 and 226 are installed, are formed in each rotating arm 211 and 221. Plates 215 and 225 having holes 215a and 225a are supported above the coupling holes 211b and 221b by a plurality of supports 214 and 224. The rotors of motors 216 and 226 connect tightly to the reel tables 210 and 220 through the holes 215a and 225a of the plates 215 and 225.

Meanwhile, a preventing means for preventing excess rotation of the rotating arms 211 and 221 is further provided constituted by protrusions 211a and 221a formed on the outer periphery of the rotating arms 211 and 221. Stoppers 217a, 217b, 227a and 227b, formed on the lower deck 200, limit the rotation of the rotating arms 211 and 221 as protrusions 211a and 221a abut the stoppers. Here, the stoppers 217a, 217b, 227a and 227b can be formed at predetermined positions along the path of travel of the protrusions 211a and 221a.

Figure 2B:
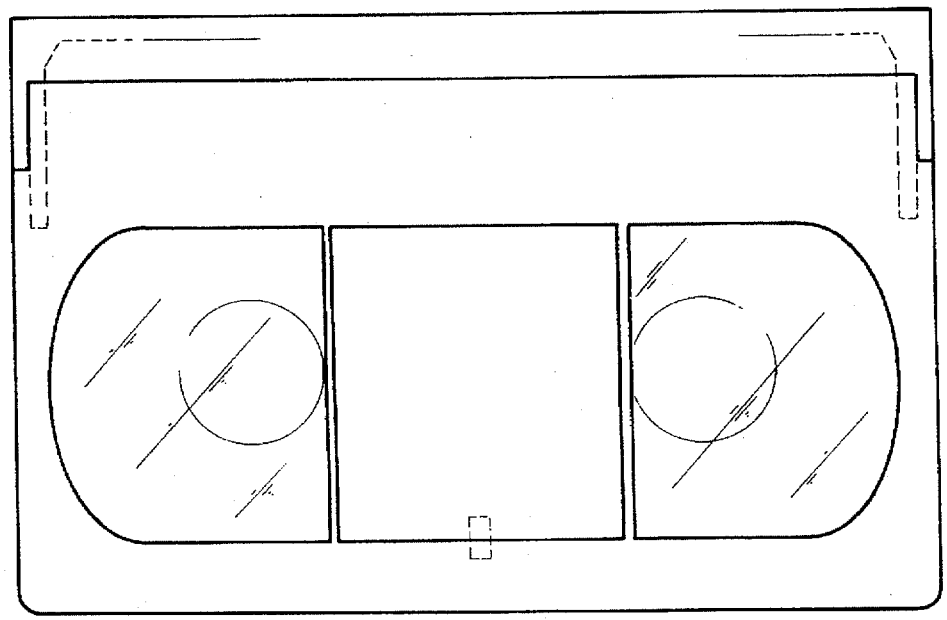
FIGS. 2A and 2B are plan views of tape cassettes of different sizes.
Figure 2A:
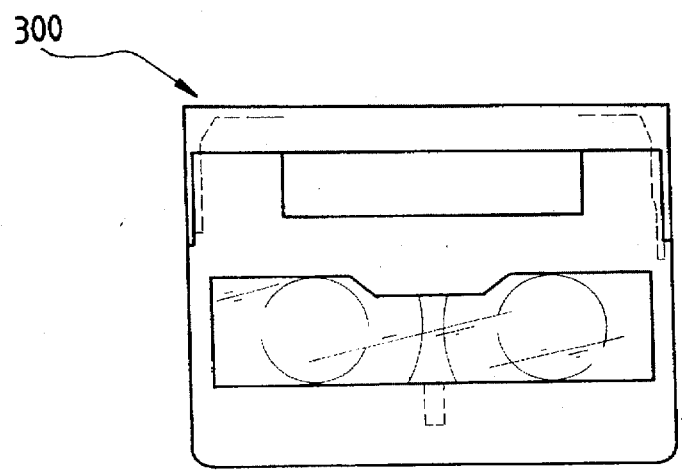
Figure 6:
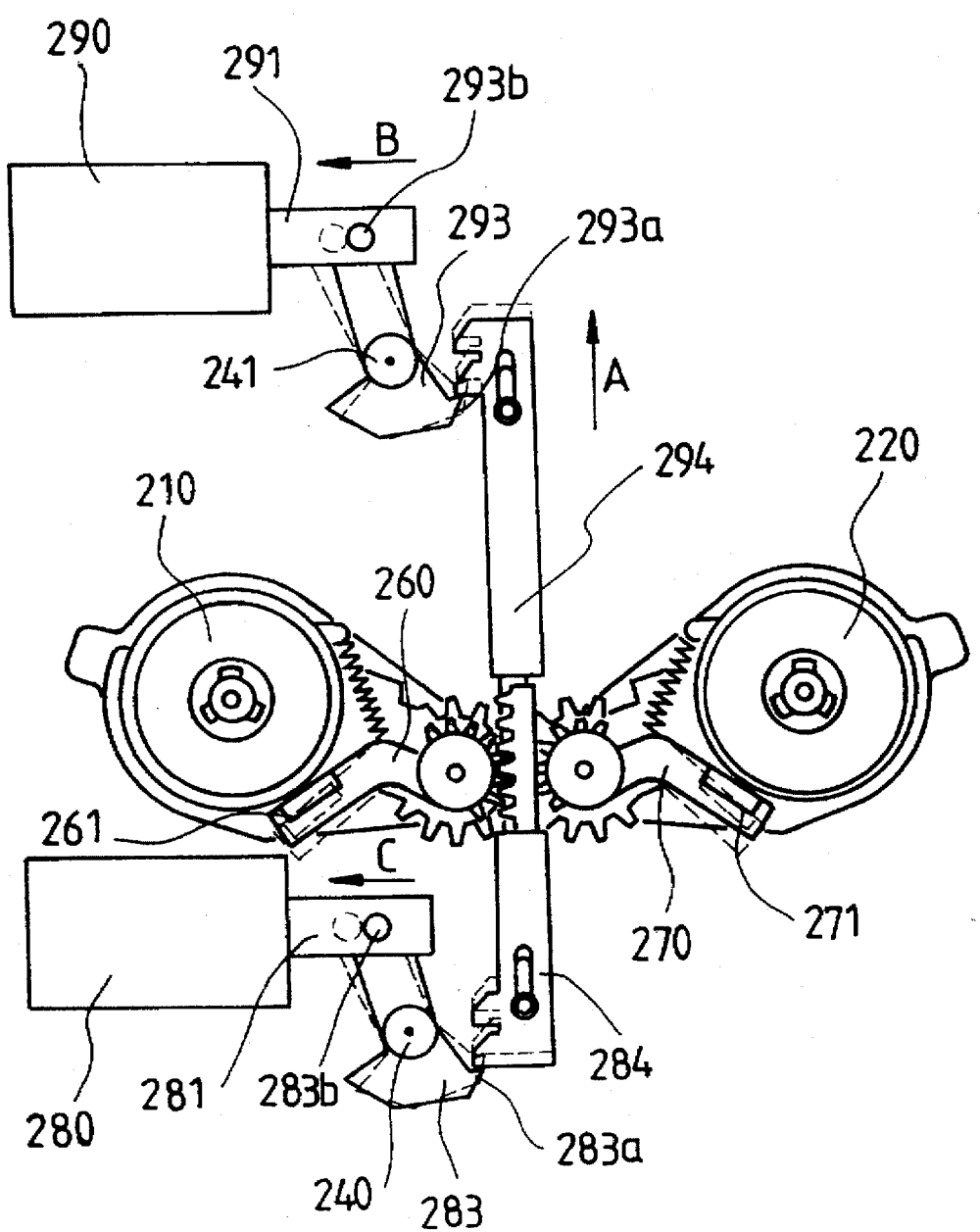
FIGS. 6 and 7 are plan views of reel brakes when reel tables are moved to place the tape cassettes of different sizes thereon.

The stoppers 217a and 227a determine the extent of rotation of the rotating arms 211 and 221 so that the large tape cassette 400 of FIG. 2A can be placed on the reel tables 210 and 220 as shown in FIG. 6. Here, the stoppers 217a and 227a are formed near the lower extrema of the through holes 200a and 200b.

Figure 7:
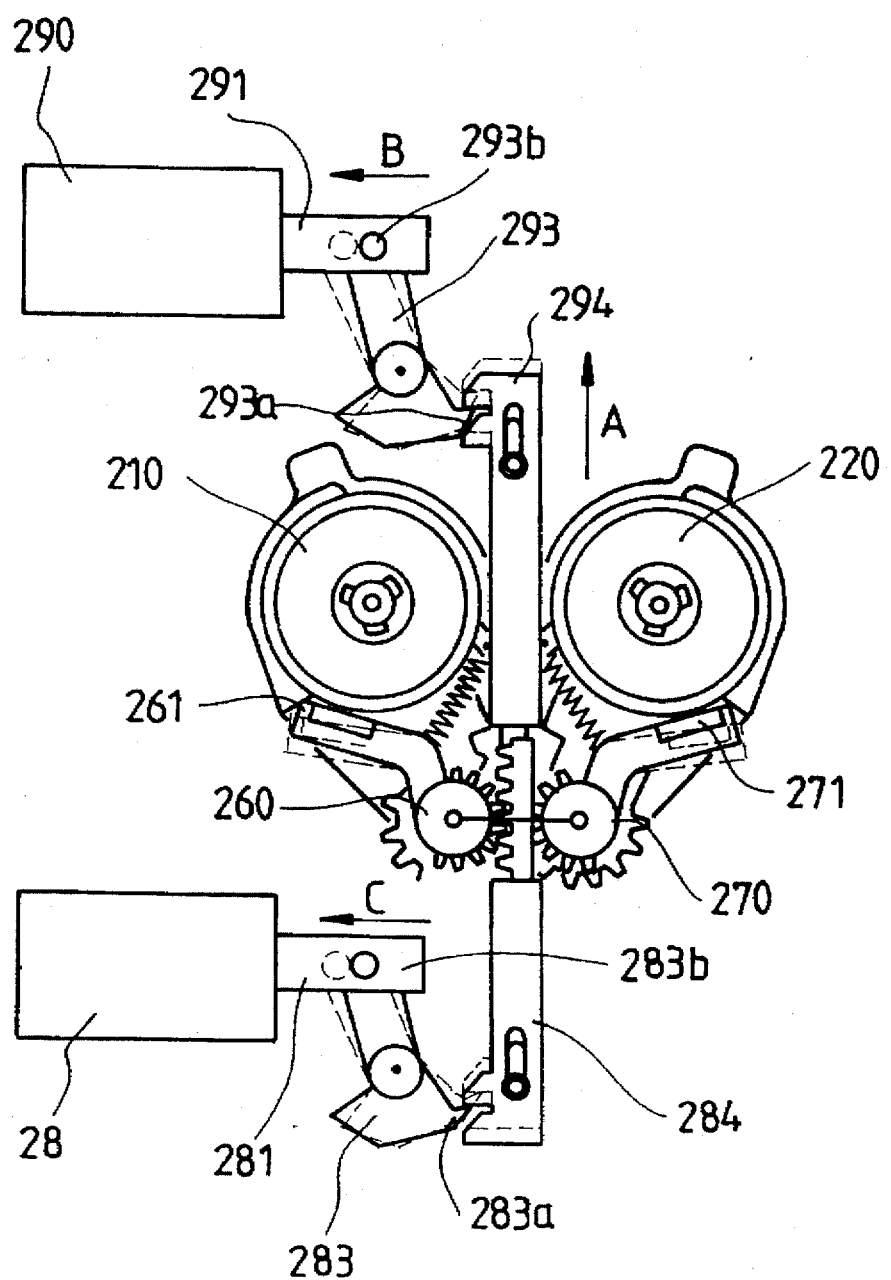

As shown in FIG. 7, the stoppers 217b and 227b determine the extent of rotation of rotating arms 211 and 221 so that the small tape cassette 300 of FIG. 2B can be placed on the reel tables 210 and 220. Here, the stoppers 217b and 227b are formed near the upper extrema of the holes 200a and 200b.

An elastic biasing means for firmly contacting the friction members 261 and 271 of the brake members 260 and 270 to peripheral surfaces of the reel tables 210 and 220 comprises springs 265 and 275. The springs are connected to the plates 215 and 225 and to the arm portions 264 and 274 of the brake members 260 and 270.

Figure 3:
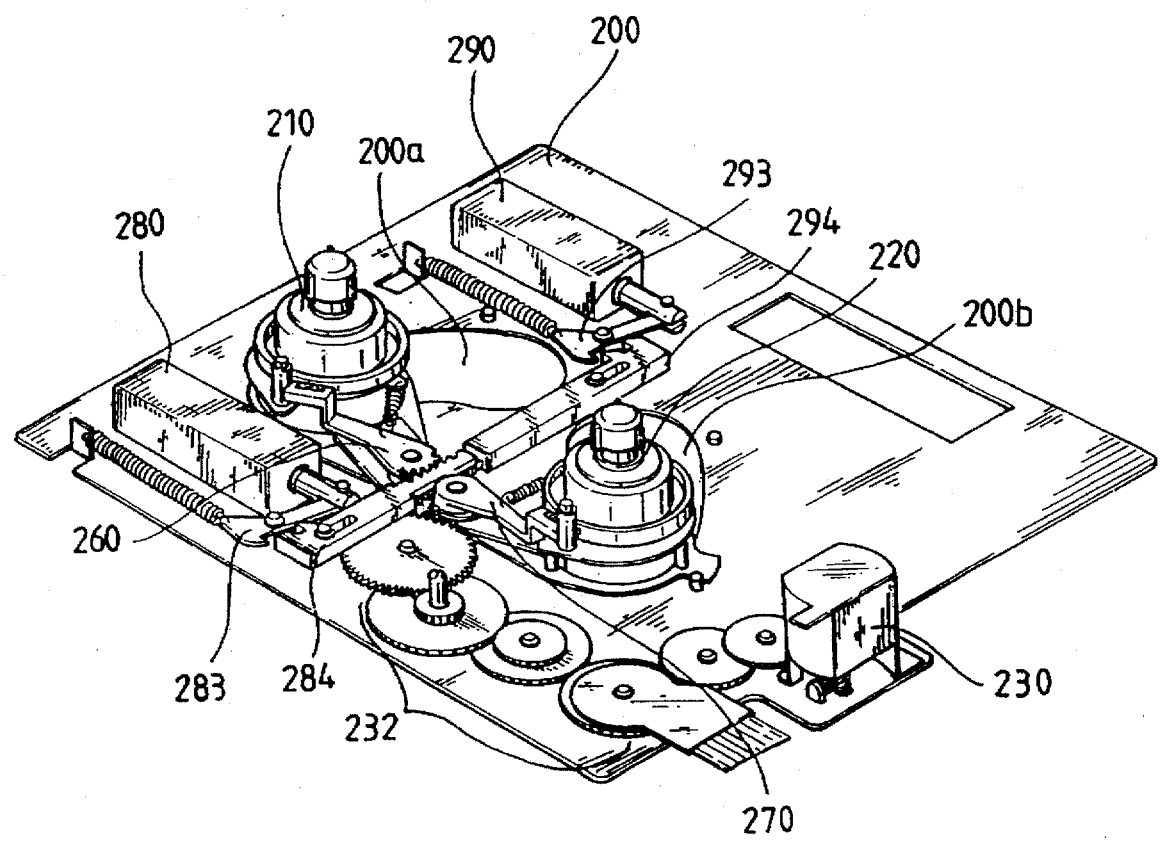
FIG. 3 is a perspective view of a reel braking mechanism according to the present invention.
Figure 4:
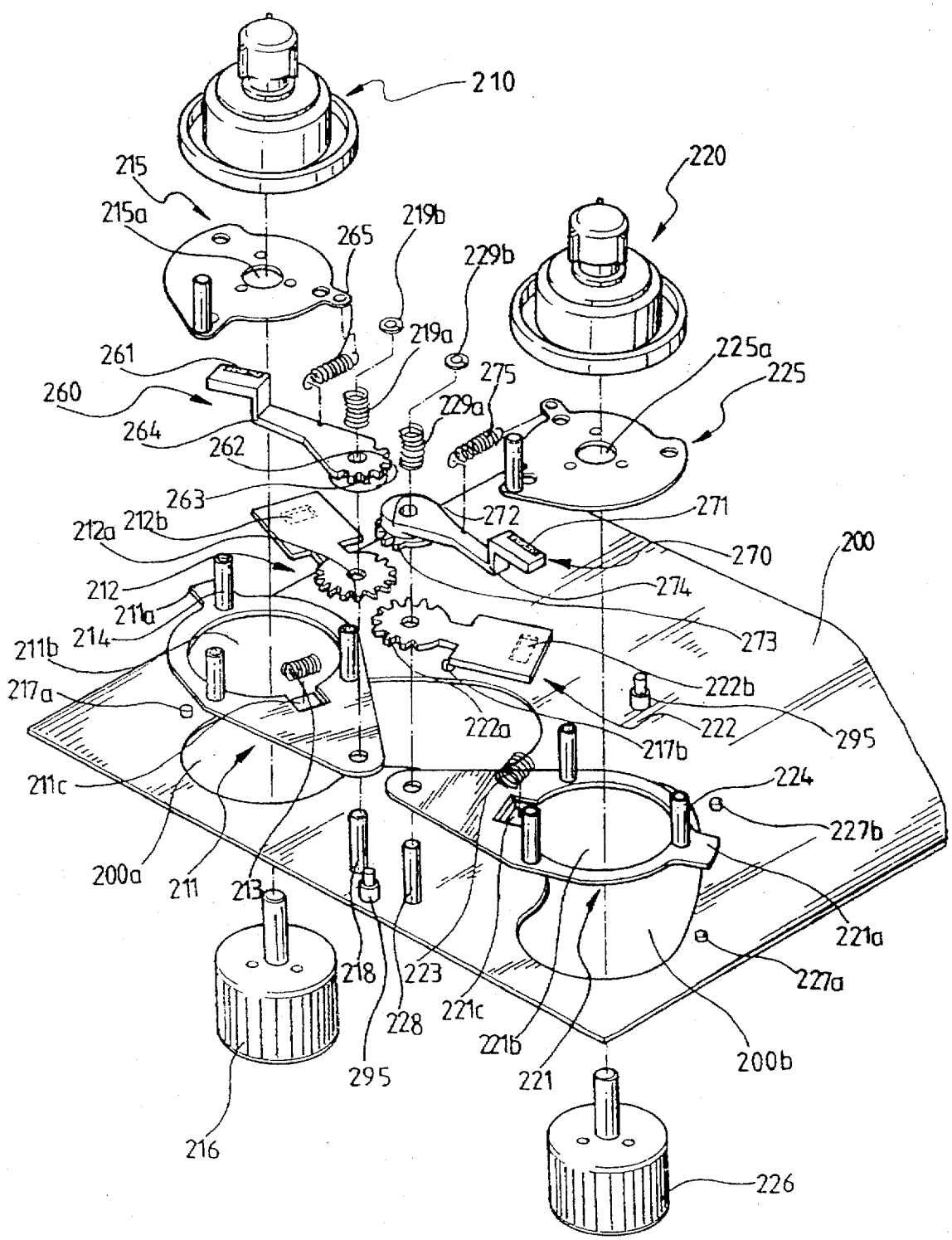
FIGS. 4 and 5 are exploded perspective views of a portion of the reel braking mechanism extracted from FIG. 3.
Figure 5:
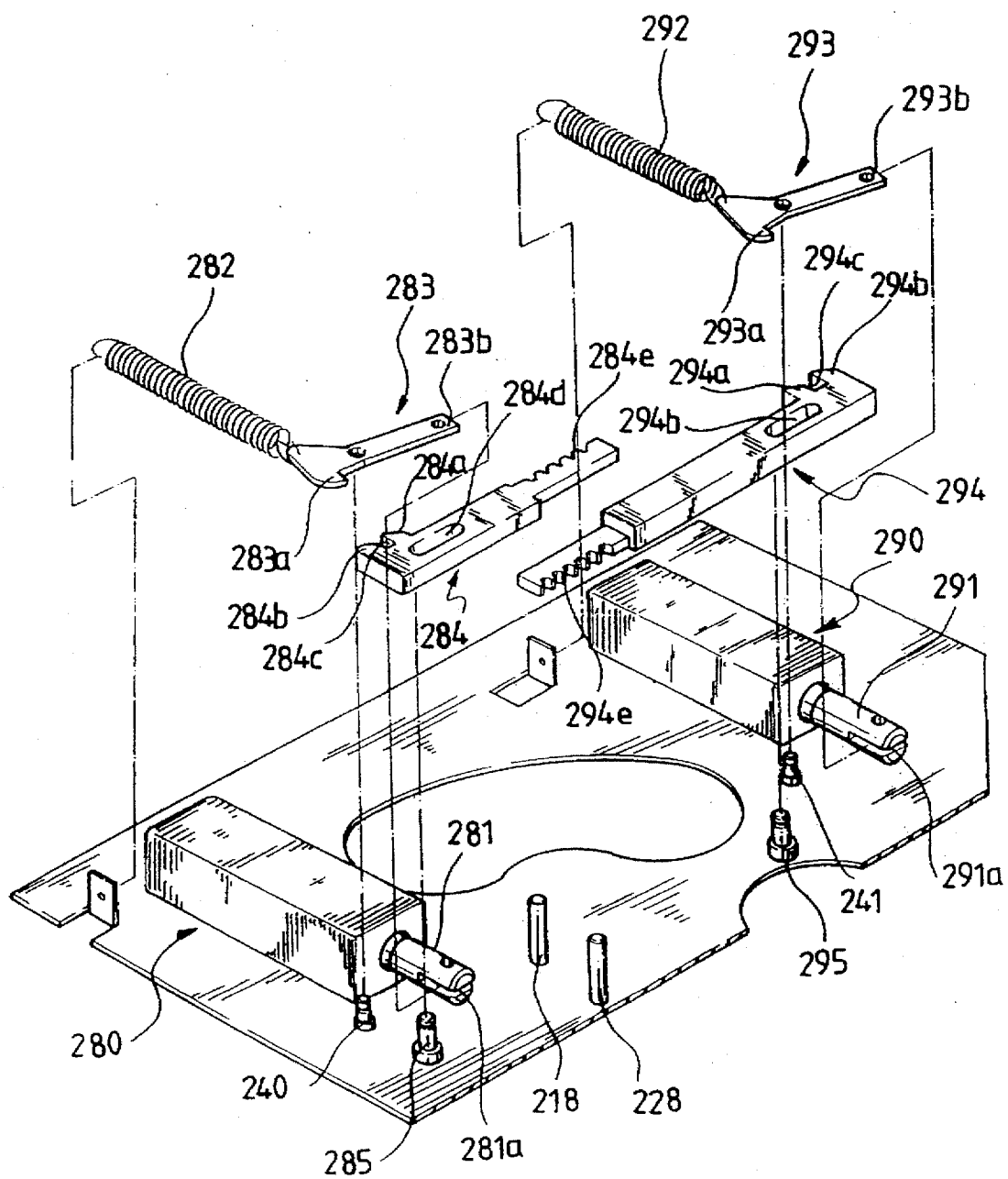

Referring to FIGS. 3–5, the releasing means includes the gear portions 263 and 273 formed on the brake members 260 and 270, respectively. Here, the gear portion 263 is formed above the boss portion 262 and the gear portion 273 is formed below the boss portion 272. A pair of moving members 284 and 294 slide between the brake members 260 and 270 on the deck 200. Guide slots 284d and 294d are formed in the moving members 284 and 294, respectively, for engaging with guide pins 285 and 295 which are installed on the deck 200. Rack portions 284e and 294e are formed on the moving members 284 and 294 to engage with the gear portions 263 and 273 of the brake members 260 and 270. Thus, when the rotating arms 211 and 221, the driving arms 212 and 222, and the brake members 260 and 270 rotate with the driving of the motor 230, the moving members 284 and 294 slide, guided by the guide pins 285 and 295. Here, even though the moving members 284 and 294 move with rotation of the rotating arms 211 and 221, since the reel tables 210 and 220, the springs 265 and 275, the brake members 260 and 270 rotate together with the rotating arms 211 and 221, the brake members 260 and 270 do not separate from the reel tables 210 and 220.

The means for moving the moving members 284 and 294 to release the brake members 260 and 270 from the reel tables 210 and 220 will be explained with reference to FIGS. 6 and 7. The brake members 260 and 270 are operated by the moving members 284 and 294, only after the reel tables have moved to their respective operating positions. As shown in FIG. 5, first and second protrusions 284a, 294a, 284b, and 294b protrude from end portions of both slidable moving members 284 and 294, and predetermined gaps 284c and 294c are formed between these protrusions. First and second solenoids 280 and 290, having operational rods 281 and 291, are fixed on the deck 200 with the operational rods corresponding to end portions of the moving members 284 and 294. Operational levers 283 and 293 are rotatably installed around pins 240 and 241, respectively, on the deck 200 to catch and release with the protrusions 284a and 284b of the moving member 284 and the protrusions 294a and 294b of the moving member 294 according to the operations of the first and second solenoids 280 and 290, respectively. The operational levers 283 and 293 have connection portions 283b and 293b rotatably connected to the operational rods 281 and 291 of the first and second solenoids 280 and 290, and the operational portions 283a and 293a selectively contacting the first protrusions 284a and 294a and second protrusions 284b and 294b of the moving members 284 and 294. The operational levers 283 and 293 are connected to the deck 200 by springs 282 and 292, respectively. Therefore, the operational levers 283 and 293 rotate by operation of the first and second solenoids 280 and 290 and selectively contact the first and second protrusions 284a, 294a, 284b, and 294b, thereby moving the moving members 284 and 294. Through this moving mechanism, the brake members 260 and 270 engage with the moving members 284 and 294 rotate and detach from the reel tables 210 and 220.

The operation of the above reel braking mechanism as will now be described.

Referring to FIGS. 2B and 3–6, when the driving motor 230 is driven so that the final gear of the gear train 232 that is engaged with the gear portion 222a rotates clockwise, the driving arms 212 and 222, the brake members 260 and 270, and the rotating arms 211 and 221 rotate to thereby move the reel tables 210 and 220 further apart from each other, as shown in FIG. 6. Here, the protrusions 211a and 221a of the rotating arms 211 and 221 are brought into contact with stoppers 217a and 227a, and the driving arms 212 and 222 are further rotated, depressing the coil springs 213 and 223. The rotating arms 211 and 221 firmly contact the stoppers 217a and 227a due to the restoring force of the springs 213 and 223, thereby stopping the reel tables 210 and 220 at their final positions. When the brake members 260 and 270 rotate together with the rotating arms 211 and 221, the moving members 284 and 294 move in the direction denoted by arrow A of FIG. 6. Also, as the rotating arms 211 and 221 rotate, the moving members 284 and 294 by themselves cannot separate the brake members 260 and 270 from the reel tables 210 and 220.

When information is to be recorded on or reproduced from the large tape cassette 400, the reel tables 210 and 220 are released according to the following operations. Referring to FIG. 6, when the operational rod 291 of the second solenoid 290 moves in the direction of arrow B, the operational portion 293a of the operational lever 293 contacts the first protrusion 294a of the moving member 294, thereby moving the moving member 294 slightly in the direction of arrow A. Here, the brake member 270 rotates clockwise and the friction member 271 separates from the surface of the reel table 220, thereby freeing reel table 220 completely. Here, the first solenoid 280 does not operate and the brake member 260 maintains contact with reel table 210 so that reel table 210 rotates with friction applied.

On the other hand, when moving members 284 and 294 are positioned for stopping the reel tables 210 and 220, the friction members 261 and 271 firmly contact the outer surfaces of the reel tables 210 and 220 due to the force of the springs 265 and 275, thereby applying resistance to the rotation of the reel tables 210 and 220.

In order to load a small tape cassette 300, the reel tables 210 and 220 move towards each other by driving motor 230 in a direction opposite of that for loading the large tape cassette 400. As shown in FIG. 7, with the reel tables 210 and 220 moved to their operating positions, when the operational rod 281 of the first solenoid 280 moves in the direction of arrow C, the operational portion 283a of the operational lever 283 contacts the first protrusion 284a of the moving member 284, thereby moving the moving member 284 slightly in the direction of arrow A. Here, the brake member 260 is rotated counterclockwise, and thus, the friction member 261 becomes separated from the surface of the reel table 210.

As described above, in the reel braking mechanism of a magnetic recording or reproducing apparatus according to the present invention, even after the distance between the reel tables is adjusted to load tape cassettes of different sizes, brake members 260 and 270 can be operated so that the rotational speeds of the reel tables can be controlled.

What is claimed is:

1. A reel braking mechanism for a magnetic recording or reproducing apparatus comprising:

a deck having first and second arcing holes;

first and second pins, separated by a predetermined distance, fixed on said deck;

first and second rotating arms rotatably connected with said first and second pins, respectively, said first rotating arm supporting a first reel table and said second rotating arm supporting a second reel table for moving said reel tables between first and second positions along said arcing holes;

first and second driving arms having gear portions engaged with each other, said driving arms rotatably connected with said first and second pins, respectively;

a driving motor for driving the gear portion of at least one of said first and second driving arms;

connecting means for connecting said driving arms to said rotating arms to transfer a force of said driving motor to said rotating arms;

first and second brake members rotatably connected with said first and second pins, respectively, and rotatable together with said first and second driving arms, respectively, wherein said brake members rotate to contact at least one of said first and second reel tables, thereby reducing the speed of said reel tables;

elastic biasing means for firmly contacting said brake members to a surface of said reel tables; and releasing means for separating said brake members from the surface of said reel tables.

2. A reel braking mechanism for a magnetic recording or reproducing apparatus as claimed in claim 1, further comprising first and second motors installed on said first and second rotating arms, respectively, for rotating said reel tables.

3. A reel braking mechanism for a magnetic recording or reproducing apparatus as claimed in claim 1, wherein said connecting means comprises:

cavities respectively formed in said first and second driving arms;

indented portions respectively formed in said first and second rotating arms to correspond to said cavities; and coil springs disposed between said cavities and said indented portions, respectively.

4. A reel braking mechanism for a magnetic recording or reproducing apparatus as claimed in claim 1, further comprising means for preventing excess rotation of said rotating arms along said arcing holes.

5. A reel braking mechanism for a magnetic recording or reproducing apparatus as claimed in claim 4, wherein said preventing means includes first and second protrusions respectively formed on said first and second rotating arms; and stoppers formed on said deck.

6. A reel braking mechanism for a magnetic recording or reproducing apparatus as claimed in claim 1, wherein a friction member is attached to each of said brake members for making friction-contact with the surface of each said reel tables.

7. A reel braking mechanism for a magnetic recording or reproducing apparatus as claimed in claim 1, wherein said elastic biasing means is a spring.

8. A reel braking mechanism for a magnetic recording or reproducing apparatus as claimed in claim 1, wherein each said brake member comprises:

a boss portion for connecting said respective brake member to one of first and second pins;

an arm portion extending from said boss portion toward one of said reel tables;

a friction portion attached at the end of said arm portion; and a spring connected to said arm portion for biasing said brake member to contact the surface of one of said reel tables.

9. A reel braking mechanism for a magnetic recording or reproducing apparatus as claimed in claim 1, wherein said releasing means comprises:

gear portions formed on said brake members;

moving members installed between said brake members to slide on said deck and to engage with said gear portions; and moving means for moving said moving members, wherein said brake members rotate with the movement of said moving members, thereby releasing at least one of said brake members from at least one of said reel tables.

10. A reel braking mechanism for a magnetic recording or reproducing apparatus as claimed in claim 9, wherein said moving means comprises:

first and second solenoids each having an operational rod, fixed to said deck; and operational levers each having connection portions rotatably supported by said deck and connected to a respective operational rod, and interlock portions for interlocking with said moving members, wherein at least one of said moving members are moved a predetermined distance when said operational levers are rotated by the operation of at least one of said first and second solenoids.

11. A reel braking mechanism for a magnetic recording or reproducing apparatus as claimed in claim 10, wherein said operational levers are connected to said deck by springs and rotatable around fixed pins.

12. A reel braking mechanism for a magnetic recording or reproducing apparatus as claimed in claim 10, wherein said moving members have first and second protrusions spaced by a predetermined distance to selectively make contact with said interlock portions of said operational levers.

13. A reel braking mechanism for a magnetic recording or reproducing apparatus as claimed in claim 1, wherein said elastic biasing means firmly contacts at least one of said first and second brake members to an outer surface of said respective reel tables.

14. A reel braking mechanism for a magnetic recording or reproducing apparatus comprising:

a deck having first and second arcing holes;

first and second pins, separated by a predetermined distance, fixed on said deck;

first and second rotating arms rotatably connected with said first and second pins, respectively, said first rotating arm supporting a first reel table and said second rotating arm supporting a second reel table for moving said reel tables between first and second positions along said arcing holes;

first and second driving arms having gear portions engaged with each other, said driving arms rotatably connected with said first and second pins, respectively;

first and second brake members rotatably connected with said first and second pins, respectively, and rotatable together with said first and second driving arms, respectively, wherein said brake members rotate to contact at least one of said first and second reel tables, thereby reducing the speed of said reel tables;

elastic biasing means for firmly contacting said brake members to a surface of said reel tables; and releasing means for separating said brake members from the surface of said reel tables.

15. A reel braking mechanism for a magnetic recording or reproducing apparatus as claimed in claim 14, wherein each said brake member comprises:

a boss portion for connecting said respective brake member to one of first and second pins;

an arm portion extending from said boss portion toward one of said reel tables;

a friction portion attached at the end of said arm portion; and a spring connected to said arm portion for biasing said brake member to contact the surface of one of said reel tables.

16. A reel braking mechanism for a magnetic recording or reproducing apparatus as claimed in claim 14, wherein said releasing means comprises:

gear portions formed on said brake members;

moving members installed between said brake members to slide on said deck and to engage with said gear portions; and moving means for moving said moving members, wherein said brake members rotate with the movement of said moving members, thereby releasing at least one of said brake members from at least one of said reel tables.

17. A reel braking mechanism for a magnetic recording or reproducing apparatus as claimed in claim 16, wherein said moving means comprises:

first and second solenoids each having an operational rod, fixed to said deck; and operational levers each having connection portions rotatably supported by said deck and connected to a respective operational rod, and interlock portions for interlocking with said moving members, wherein at least one of said moving members are moved a predetermined distance when said operational levers are rotated by the operation of at least one of said first and second solenoids.

* * * * *